Sept. 22, 1970   E. A. LINK   3,530,417

CAPSULATED ELECTRICAL APPARATUS

Original Filed April 10, 1967

INVENTOR.
Edwin A. Link
BY
Attorney

United States Patent Office 3,530,417
Patented Sept. 22, 1970

3,530,417
CAPSULATED ELECTRICAL APPARATUS
Edwin A. Link, Waukesha, Wis., assignor to RTE Corporation, Waukesha, Wis., a corporation of Wisconsin
Continuation of application Ser. No. 632,425, Apr. 10, 1967. This application May 26, 1969, Ser. No. 828,808
Int. Cl. B44d 1/14; H01f 27/02
U.S. Cl. 336—96
2 Claims

ABSTRACT OF THE DISCLOSURE

An electrical apparatus such as a core or coil having a uniform semirigid skin with a flowable dielectric material completely filling the space within the skin. The dielectric material will not form any fissures under varying temperature conditions.

---

This application is a continuation of my copending application Ser. No. 632,425 (now abandoned) which is a continuation-in-part of my copending application Ser. No. 512,977 (now abandoned) which is a continuation-in-part of my copending application Ser. No. 153,454, filed Nov. 20, 1961 (now abandoned).

The present invention has many and varied applications and is particularly well adapted for use in instances where the apparatus to be capsulated includes a porous electrically responsive elements such as, a capacitor, resistor or core, and coil assembly of a high voltage transformer by way of example, impregnated with a dielectric material.

One serious problem which has been common in electrical apparatus which has been impregnated with a dielectric material is the inability to insure against the formation of fissures or voids in the apparatus. These fissures or voids around or near the electrical elements of the apparatus allow for the electrical breakdown of the apparatus. If a polymer is used to impregnate the apparatus fissures or voids will form due to the shrinkage of the polymer and the difference in the coefficient of thermal expansion of the polymer and electrical element. Thermoplastic materials which have different shrinkage characteristics than the electrical components will crack leaving voids in the dielectric material.

In some instances, the apparatus has been impregnated with oil and then encased in a solid one-piece resin casting. The fluid nature of the impregnant has resulted in a certain amount of run-off or loss resulting in the formation of detrimental voids in the apparatus housed within the casting.

The primary object of the present invention resides in the provision of a new and improved method and means whereby the formation of voids in a dielectrically impregnated porous electrically responsive element is eliminated.

Another object of the present invention resides in the provision of a new and improved capsulated electrical apparatus capable of effective operation in applications where it is exposed to all manner of weather conditions.

Another object resides in the provision of a new and improved capsulated electrical apparatus impregnated with a dielectric material that provides the advantages of an oil filled unit without requiring the use of a protective metal tank containing a relatively large volume of dielectric fluid in which the apparatus is submerged.

Another object resides in the provision of a piece of electrical apparatus in the form of a high voltage distribution transformer constructed in a manner to eliminate the necessity of submerging the core and coil assembly in a dielectric containing protective metal tank that requires mechanical sealing.

Another object resides in the means by which various sizes of dielectrically impregnated electrically responsive elements may readily be capsulated by the application of a contour retaining protective sealing coating of resin material.

Another object of the present invention is to provide an improved capsulated apparatus which is impregnated with a rehealable material to eliminate voids therein.

Another object of the present invention is to provide an improved capsulated electrical device that has a non-fissurable material completely filling the space within the outer coating.

Another object resides in the impregnation of a porous electrically responsive element with a thixotropic material to eliminate voids therein and preclude the possibility of leakage of the impregnating material from the element.

Another object resides in the method of applying a coating of inert powdered inorganic material to encompass the thixotropic impregnated element.

Another object resides in the method of applying a coating of plastic resin to afford a means for capsulating and sealing the impregnated electrically responsive element.

Another object resides in the method by which layers of powdered inert organic material and plastic resin may be alternatively applied to the thixotropic impregnated electrically responsive element.

Another object resides in the fact that the capsulating sealing and protective covering for the dielectrically impregnated electrically responsive element has sufficient elastic properties to preclude the formation of cracks, fissures or voids therein that might otherwise be caused by polymerization, mishandling or mechanical stress caused by either expansion or shrinkage due to thermocycling.

Another object of the present invention is to provide an improved method of insapsulating a porous electrically responsive element impregnated with a dielectric material that does not require the use of a mold in order to coat the product.

Another object of the present invention is to provide a method for encapsulating a porous electrically responsive element after impregnation of the electrically responsive element while the impregnated element is in an unsupported condition.

These objects are accomplished by impregnating the electrical element, whether a core or coil with a dielectric material that has thixotropic characteristics or is thixotropic. This material is usually impregnated by means of a vacuum process and because of its thixotropic characteristics does not require any outer covering or mold to retain it within the electrical device after impregnation. The impregnated device can then be encased within a coating by either dipping the device or spraying it with a resin material. The dielectric material will then substantially completely fill the inside of the casing.

One particularly significant advantage of this method of encapsulating an electrical device is that the coating will be uniform over the entire device.

Other objects and advantages will become apparent from the following description of an illustrative embodiment of the present invention.

In the drawing:

FIG. 3 is a magnified view of the circled portion of

Figure 1:
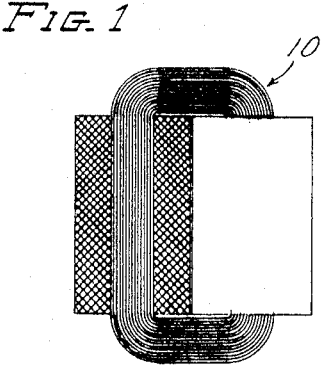
FIG. 1 is a showing, partially in section, of an untreated piece of electrical apparatus in the form of a core and coil assembly.
Figure 2:
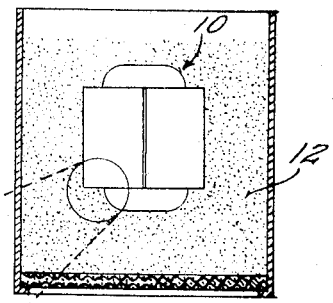
FIG. 2 is a diagrammatic showing of a temperature controlled tank containing a bed of fluidized inert powdered inorganic material into which the impregnated core and coil assembly is introduced to apply a coating of the material to the impregnated assembly.
Figure 3:
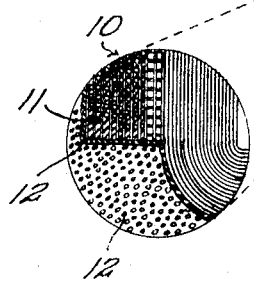
Figure 4:
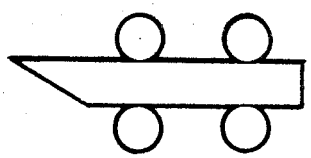
Figure 5:
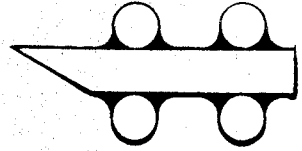
Figure 6:
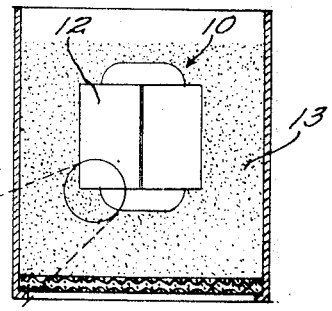
Figure 7:
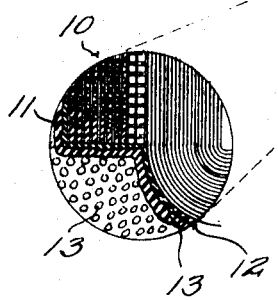
Figure 8:
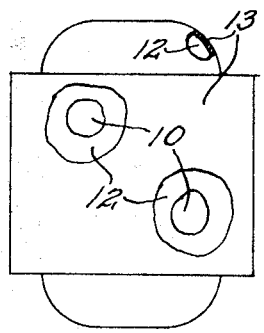

FIG. 2 showing the thixotropic material filling the interstices of the coil together with the surface coating of the powdered inorganic material;

FIG. 4 is a diagrammatic view showing the uniform thickness of the coating applied by the fluidized bed method;

FIG. 5 is a diagrammatic view showing the nonuniform coating resulting from previous conventional methods;

FIG. 6 is a diagrammatic showing of a tank containing the bed of fluidized plastic resin into which the impregnated, coated core and coil assembly introduced to apply a coating of plastic resin to seal and capsulate the assembly;

FIG. 7 is a magnified view of the circled portion of FIG. 6 showing the protective coating of plastic resin applied to seal and capsulate the same; and FIG. 8 is a view of the completely capsulated core assembly.

Before entering into a detailed description of the present capsulated electrical apparatus, embodying the teachings of the present invention, it is believed that a definition of some of the terms employed will serve to advantage in the comprehension of the scope of the present invention.

The term "thixotropic dielectric material" as used herein refers to any dielectric material which is capable of permitting flowing action without reaching either a permanent solid or free running, drop forming consistency. By way of example such materials as isopropylenes, polyphenyls, polyphenylethers and the like which are treated with an appropriate jelling agent to render them thixotropic serves the desired purpose. Dielectric materials which are not thixotropic may also be included if they have high viscosities which vary with temperature. Hydrocarbons, ethers, halogenated hydrocarbons, etc. may be used so long as they have a rehealable or fluid state within the operating range above 0° C. Monomers and newtonian liquids may also be used under certain temperature conditions. It should also be recognized that the impregnants be noncrystalline at temperatures below their melting point.

The term "powdered inert inorganic materials" as used herein define materials such as silica sand, diatomaceous earth, aluminum oxide, zirconium oxide and equivalent materials.

The term "plastic resins" as used herein encompasses resins having either thermoplastic or thermosetting properties.

The term "fluidized resin" as used herein encompasses powdered forms of epoxies, urethanes, cellulosics, and equivalent materials.

The accompanying drawing illustrates an embodiment of the present invention used in conjunction with a porous electrically responsive element, in the form of a core and coil assembly of a high voltage transformer of the type that does not have to be submerged in a body of dielectric fluid contained in a protective metal tank.

To the best of applicant's knowledge, previous attempts to provide a high voltage distribution transformer for outdoor use that does not embody a core and coil assembly submerged in a dielectric fluid contained within a protective metal tank have not been entirely satisfactory. Among these prior attempts has been that of impregnating the core and coil assembly of a transformer with a hardenable resin to form resin casting. Because of the difference in the thermal expansion of the materials employed and the many cycles of temperature changes, damaging stresses frequently occur which result in early fatigue and failure caused by electrical breakdown due to the resulting cracks formed in the casting. A more specific problem involved in this type of apparatus lies in the frequency with which impulse surges caused by lightning or switching disturbances result in severe damage to the apparatus.

The principal reason for the long adherence to the use of the conventional tank type transformers, for outdoor installations, has been the protective properties of the metal tank coupled with the large volume of oil that compensated for temperature changes in the transformer.

The initial step in the practices of the present invention comprises the suitable drying and impregnating of the piece of electrical apparatus, illustratively shown as a core and coil assembly 10, by vacuum or other suitable asseptable methods and impregnating of the same, in any approved manner, preferably with a thixotropic material 11 to thereby eliminate voids in the interstices of the assembly. This step is well known and is accomplished by heating the electrical apparatus and subjecting it to a vacuum in an autoclave. After drying and while still subjected to a vacuum the electrical apparatus is impregnated with an impregnant that is still in the liquid state.

The surface of the impregnated assembly is then heated, in any approved manner, to facilitate the subsequent coating or capsulating of the same. In the illustrated form of the invention, the impregnated assembly is heated by submerging the same in a tank, schematically shown in FIG. 2, containing hot fluidized finely powdered inorganic material 12, with the result that a coating of the material adheres to the entire surface of the impregnated assembly.

The heated coated assembly is then withdrawn from the tank, containing the hot powdered inert inorganic material, and immediately immersed in a tank, schematically shown in FIG. 6, containing a fluidized bed of powdered resin 13 having a thermoplastic characteristic and the ability to fuse to the heated assembly to apply a coating of resin to seal and capsulate the same.

The capsulated assembly may be further processed by the alternate dipping of the same into the tank containing hot fluidized powdered inorganic material and the tank containing fluidized resin until the successive coatings have reached the desired thickness to provide a shell capsulating the thixotropic impregnated coil assembly. The nature of the resin is such that the ultimate shell formed in intimate contact with the impregnated coil assembly is semirigid in form and has sufficient elastic properties to preclude the formation of cracks, fissures or voids that might otherwise be caused by polymerization, mishandling or mechanical stress caused by either expansion or shrinkage due to thermocycling.

If additional strength is required in the capsulating shell, this may be obtained by the addition of any suitable material such as fibre glass or leaf-like mica which may be added to the coating material.

It is also to be understood that any suitable means such as spraying or dipping may be employed to effect the application of the coating material to the impregnated porous electrically responsive element.

One of the principal advantages of the ability of the impregnated apparatus to be coated without a mold is the resulting uniformity in the thickness of the coating on the apparatus. There will be no build up of resin or heavy sections on the apparatus. The coating must have some flexibility in order to allow for the expansion and contraction of the impregnant due to temperature variation. If the coating is not uniform, there will be a greater tendency for the coating to break down in the areas of the thick or heavy sections of the coating.

In a more specific application of the present invention, a transformer core and coil assembly was prepared with the leads and terminals taped to keep them free of impregnant during processing. The assembly was then subjected to vacuum drying which includes a preheating of the coil and core to a temperature of 150° F. to 450° F. depending on the insulating system employed. After heating it is subjected to a vacuum in an autoclave until an absolute pressure of 5 mm. of mercury or lower is achieved. It is then impregnated with a material which is in a liquid state. This is accomplished while the dried core and coil is still under vacuum.

Materials employed as impregnants must have electrical insulating characteristics, and be rehealable or remain in a fluid state within the operating temperature range of the assembly, i.e. 0° C. These materials should be noncrystalline at temperatures below their melting point.

Materials which have been found suitable as impregnants are hydrocarbons, ethers, halogenated hydrocarbons, etc. These materials might be made thixotropic so that they will remain in the interstices of the core and coil assembly after impregnation.

Other materials which could be used as impregnants are monomers that are polymerized into a permanent rehealable jelly state after impregnation.

It is also possible to use newtonian liquids as impregnants which become waxlike at temperatures below 0° C. The coating or shell of plastic material can then be applied to this outer surface of the assembly at low temperature.

The following are typical examples of the processes described above.

EXAMPLE 1

Thixotropic impregnant coated with plastic by fluidized bed

The coil and core assembly to be encapsulated is first dried with heat and vacuum. While the vacuum dried unit is still under a vacuum, predried and degassed thixotropic impregnating liquid is brought up to a temperature of approximately 300–400° F. and allowed to enter the impregnating chamber. We have found that a thermally stable hydrocarbon oil with a freeze point at approximately 0° C. and a low vapor pressure at 400° F. provides a good impregnant for the core and coil. This oil is made thixotropic even at these temperatures by adding about 5 parts/100 of "Cab-O-Sil," made by Cabot Corp., Boston. "Cab-O-Sil" is a pyrogenic silica having an extremely small particle size. It is considered to be a pure substance containing 99.8% silica. After the assembly is impregnated, the excess blown off, and terminals stripped of tape, the unit is dipped into a hot fluidized bed (at about 400° F.) of silica to bring it up to a surface temperature in excess of 370° F. Following this, the unit is dipped into a fluidized bed of epoxy resin. This forms the first seal coat over the impregnated assembly. To cure and build up additional coats and for obtaining thickness, the unit is reheated in the hot silica bed and again dipped into the resin bed. The silica in each dipping bonds to and fills the resin coat system. This improves the strength of the shell and imparts improved thermal conductivity to the shell. Each cycle of dip coat (silica and resin) adds approximately 20–40 mils of coating to the unit.

EXAMPLE 2

Monomer impregnant that forms a rehealable jelly when polymerized

Using an impregnating technique as outlined above, or any other good vacuum drying and impregnating method, a core and coil assembly is processed and impregnated with a monomer which is activated with a curing agent. A material similar to "Dielectric Gel," produced by Dow Corning, satisfies the rehealing dielectric characteristics we require. "Dielectric Gel" is a silicon potting material sold by Dow Corning under the trademark "Sylgard." After impregnation, the unit is removed and the liquid cured. This curing may be accelerated by the addition of heat, however, this is not necessary if sufficient heat is retained in the unit during the impregnating cycle.

Excess Dielectric Gel can be removed just prior to the formation of the outside protective casing. This casing can be made of a number of materials and techniques. A polyester glass laminate may be built up by means of a combination spray method employed by many present-day boat builders. This method is well known in the field of the low pressure laminate industry.

EXAMPLE 3

Newtonian liquids which have solidification points at +10° C. or lower and waxlike (noncrystalline) down to −40° C.

Materials such as hydrocarbons, ethers, silicones, etc., which are not made thixotropic, can be impregnated into the core and coil assembly and processed void free within a shell using the following techniques.

The electrical element is dried and vacuum impregnated with a newtonian liquid as described above. It is then cooled to a point where the impregnant becomes a high viscosity liquid. At this time, the core and coil is withdrawn from the impregnating autoclave. Hot air may be directed onto the surface of the impregnating element to remove any excess impregnant that may have accumulated on the surface of the element.

The element is lowered into a bath of high density liquid which has been cooled to a very low temperature. Such materials as carbon tetrachloride, tetrachloro ethylene, or the like, even mercury can be employed as the low temperature coolant. In order to prevent the impregnating liquid from becoming contaminated during this process, a film of polyethylene may be interposed as the element is lowered into the coolant. After the entire assembly has been cooled and the newtonian liquid solidified, the assembly with the polyethylene film is removed and prepared for immediate encapsulating with a highly activated resin. If desired, the impregnated device could be coated with lead rather than resin. After impregnation the apparatus should be cooled and then dipped into a molten lead bath. The lead will set on the outer surface of the apparatus providing the protective coating.

From the foregoing description of the present invention, it will readily be seen that a new and improved capsulated electrical apparatus has been provided which is capable of use in applications where it is exposed to widely varied adverse atmospheric conditions.

One of the marked advantages of the present invention flowing from its use in a high voltage distribution transformer unit resides in the fact that the capsulated core and coil assembly need not be submerged in a protective metal tank containing dielectric fluid.

Another marked advantage resides in the fact that the yieldable nature of the capsulation coating which seals the piece of electrical apparatus also provides a protective covering therefor to minimize the possibility of damage thereto.

Another marked advantage resides in the use of a thixotropic material to impregnate the porous electrically responsive element to insure against the formation of voids in the element which, in the past, have been a major cause for electrical breakdown of the unit.

Another marked advantage resides in the use of a thixotropic material as the impregnant, which, by virtue of its inherent characteristics, insures its retention in the impregnated element by precluding the possibility of the formation of voids in the element through its loss.

Another advantage of the present capsulated piece of electrical apparatus resides in the fact that the contour of the shell conforms with that of the apparatus and does not require the use of varying sized molds to accommodate different sized pieces of electrical apparatus.

I claim:

1. A void-free electrical device comprising a transformer having
   a porous coil assembly,
   a dielectric material completely filling the interstices of said assembly and having a viscosity capable of permitting flowing action without reaching either a solid or a free-running drop forming consistency at the operating temperature of said assembly
   and a coating of semirigid contour retaining resin in intimate contact with the entire outer surface of said assembly and said dielectric material, thereby encapsulating said dielectric material within said coating.

2. A void-free electrical device comprising a transformer having
a porous electrical core and coil assembly,
a dielectric material completely filling the interstices of said assembly and having a viscosity capable of permitting flowing action without reaching either a solid or a free-running drop forming consistency at the operating temperature of said assembly
and a coating of semirigid contour retaining resin or lead in intimate contact with the entire outer surface of said assembly and said dielectric material, thereby encapsulating said dielectric material within said coating.

References Cited

UNITED STATES PATENTS

| | | | |
|---|---|---|---|
| 2,983,964 | 5/1961 | Vocht | 264—272 |
| 3,068,533 | 12/1962 | Raimondi | 264—272 |
| 3,119,085 | 1/1964 | Tiejema | 336—96 |

WILLIAM D. MARTIN, Primary Examiner

R. HUSACK, Assistant Examiner

U.S. Cl. X.R.

117—21, 26, 29, 61, 102, 217, 218; 174—52; 264—272; 336—205